United States Patent [19]
Edick

[11] 3,862,443
[45] Jan. 21, 1975

[54] COOLING MEANS FOR BEARING STRUCTURE IN DYNAMOELECTRIC MACHINE

[75] Inventor: John D. Edick, Wickliffe, Ohio

[73] Assignee: Reliance Electric Company, Cleveland, Ohio

[22] Filed: Nov. 15, 1973

[21] Appl. No.: 415,960

[52] U.S. Cl. .................. 310/57, 310/64, 310/90, 310/43
[51] Int. Cl. ............................................. H02k 9/18
[58] Field of Search ............. 310/43, 90, 63, 57, 55, 310/62, 64, 65

[56] References Cited
UNITED STATES PATENTS

| | | | |
|---|---|---|---|
| 2,228,104 | 1/1941 | Baudry | 310/63 UX |
| 2,458,010 | 1/1949 | Ludwig | 310/57 |
| 2,644,099 | 6/1953 | Ludwig et al. | 310/57 |
| 2,819,415 | 1/1958 | Waterman | 310/57 |
| 3,695,344 | 10/1972 | Schnitzler, Jr. | 310/43 X |

*Primary Examiner*—Donovan F. Duggan
*Attorney, Agent, or Firm*—Woodling, Krost, Granger & Rust

[57] ABSTRACT

A thermally insulated and cooled bearing is disclosed for a totally enclosed motor or generator machine. The bearing is thermally coupled to an inner surface internal the machine and an outer surface external the machine. Thermal insulation adjacent the inner surface insulates the bearing from the elevated gas temperature within the machine. An external fan mounted on the machine shaft removes heat from the outer surface to provide a reduced operating temperature of the bearing.

9 Claims, 4 Drawing Figures

PATENTED JAN 21 1975

COOLING MEANS FOR BEARING STRUCTURE IN DYNAMOELECTRIC MACHINE

BACKGROUND OF THE INVENTION

1. Field of the Invention

This invention relates to electrical generators or motor structures and more particularly to dynamoelectric rotary devices with cooling or fluid contacts.

2. Description of the Prior Art

The prior art has known many ways to cool a bearing in a rotating machine such as a generator, motor and the like. Bearing life is inversely related to the operating temperature of the bearing. If the bearing temperature can be reduced under a given set of operating conditions, the bearing life will be extended with increased reliability of the machine.

The art of cooling bearings in electric motors and generators has had a long development in the art. This development began in open motors using a fan located on the motor shaft to direct air to the bearings to reduce the bearing temperature. This process provided increased bearing life for open machines but was unsatisfactory to cool bearings in totally enclosed motors or generators. In a totally enclosed motor or generator a frame and bearings enclose a rotor journalled on the bearings. The heating of the bearing is primarily the result of the gas inside the motor which is elevated in temperature by the heat generated by the rotor and stator windings. The frame has dissipation of heat to the ambient and does not appreciably heat the bearing.

The prior art has attempted to cool bearings in totally enclosed motors by cooling an outside surface thermally coupled to the bearing by an external shaft fan. This arrangement was unsatisfactory since the external fan was insufficient to cool the bearing from the elevated gas temperature inside the machine. The prior art has attempted to circulate the air internal the motor or generator. This was also unsatisfactory since there was little transfer of heat from the inside of the machine to an outside ambient. Circulation of the internal air which is elevated in temperature is totally inadequate to cool the bearing.

Therefore an object of this invention is to provide a thermally insulated bearing which is thermally insulated from the elevated gas temperature internal a machine.

Another object of this invention is to provide a thermally insulated bearing for use with totally enclosed machines.

Another object of this invention is to provide a thermally insulated bearing which is easily adapted to existing machines.

Another object of this invention is to provide a thermally insulated bearing wherein the bearing is thermally insulated from the gas internal the machine and wherein the bearing is force cooled by ambient air.

Another object of this invention is to provide a thermally insulated bearing which provides a decrease in operating temperature in excess of 25°C from the prior art.

SUMMARY OF THE INVENTION

This invention may be incorporated in a dynamoelectric machine, comprising in combination: a frame; a rotor; bearing means; means mounting said bearing means to said frame for journalling said rotor, thermal insulation means established to thermally insulate said bearing means from the gas internal the machine; and means for removing heat from said bearing means to provide a reduced operating temperature of said bearing means.

DESCRIPTION OF THE PREFERRED EMBODIMENT

Figure 1:
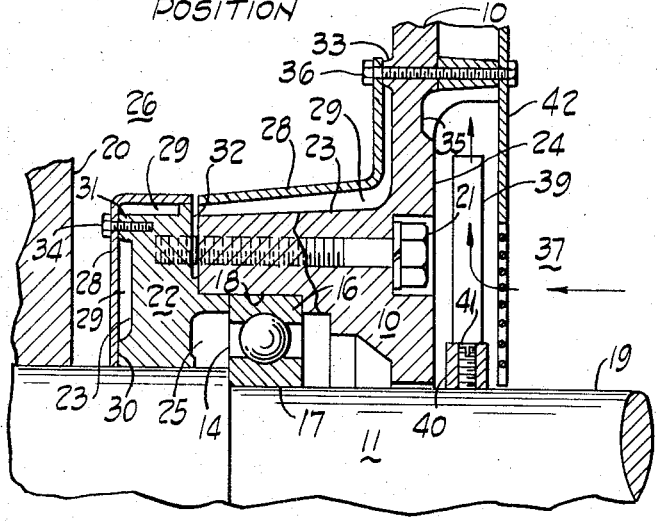
FIG. 1 is a longitudinal sectional view of a thermally insulated bearing in a dynamoelectric machine and which is the preferred embodiment of this invention.

FIG. 1 is a longitudinal sectional view of a thermally insulated bearing for a rotating machine comprising a frame 10 adapted to receive bearing means 14 shown as a ball bearing having an outer race 16 and an inner race 17 for journalling a rotor 11. The rotor 11 comprises a shaft 19 and an armature 20 which has a winding with the frame 10 bearing means 14 and shaft 19 totally enclosing the rotor 11. The bearing outer race 16 fits closely within a bore 18 in the frame 10 and is held in engagement by a bearing cap 22 secured by a cap screw 21. The bearing cap 22 forms a grease cavity 25 and comprises a portion of an inner surface 23 of the machine. The inner surface 23 is in thermal contact with the bearing 14, through a metallic material such as steel, cast iron, or the like which has a relatively high thermal conductivity. The high thermal conductivity frame 10 has an outer surface 24 which is in thermal contact with the bearing 14 through the outer race 16.

Cooling of bearings in totally enclosed motors or generators was a significant problem in the prior art since it was not possible to transfer a sufficient amount of heat from the bearing to an outside ambient. The stator and rotor windings, not shown, produce a substantial amount of heat to increase the internal gas temperature which heats the bearing. The present invention provides insulating means shown as shield means 28 which is spaced from the inner surface 23 creating an insulating air or gas space 29. The shield means 28 is shown to be in two sections and may be sheet metal such as steel or aluminum supported by projections 30, 31, 32, and 33 and secured by screws 34 and 36. The projections 30–33 may be an insulating material or may be a metallic material if the area of the projections is small compared to the total area of the internal surface 23. Consequently the contribution of heat to the bearing 14 through these projections is small due to the relatively small cross-sectional area. The air space 29 provides an effective insulator for the bearing 14 from the gas 26 internal the machine if the air space has a thickness of at least one-eighth of an inch. It is critical that no large surface areas of material having a relatively high conductivity directly interconnect the internal air 26 with the bearing 14. Some prior art patents show air spaces but these air spaces are adjacent large areas of thermally conductive material connecting the bearing with an inner surface. Consequently, the air spaces in these prior art patents cannot function as an insulator.

The frame 10 includes a pinch point 35 where the cross-sectional area of the frame is narrowed to limit the heat flow and essentially insulate the major portion of the frame from the portion of the frame surrounding the bearing. The invention provides means 37 for removing heat from the outer surface 24 shown as fan means comprising a fan 39 mounted on mounting ring 40 and secured to the shaft 19 through a mounting screw 41. The fan 39 is located within a fan cover 42 to force air across the outer surface 24 as shown by the arrows. The fan 39 not only improves the heat dissipation of the motor through frame 10 but also increases the heat conductivity through the bearing cap 22 and frame 10 to create a greater heat gradient across the thermal insulation 29. The arrangement of a means thermally insulating the bearing 14 from the gas 26 internal the machine in combination with means 37 for removing heat from the bearing 14 provides a thermally insulated and cooled bearing with a reduced operating temperature.

Figure 2:
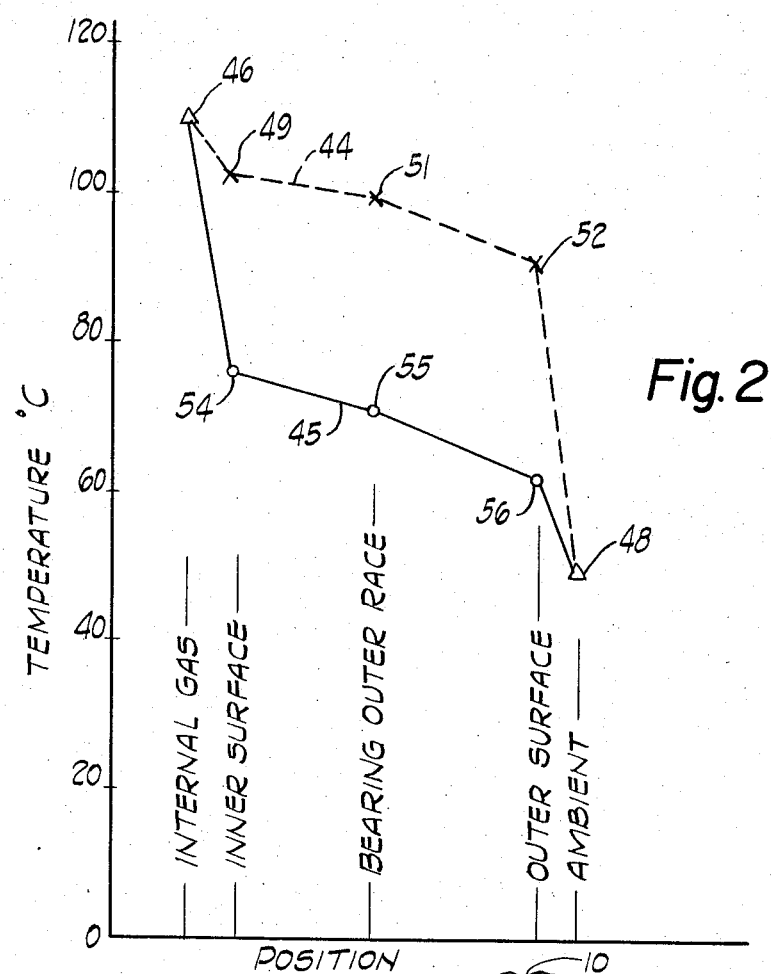
FIG. 2 is a graph of temperature vs. position along the axis of the shaft of FIG. 1.

FIG. 2 is a graph of temperature as a function of position along the shaft 19 in FIG. 1. The graph includes a dashed curve 44 of a motor run without the thermal insulation and without the fan whereas the solid curve 45 illustrates the same motor with the thermal insulation and fan. The curves are compiled from actual data measured on an EA449T 250 Horsepower (H.P.) Reliance Electric motor run at 3,600 RPM with a test load of 250 H.P. for curve 44 and a test load of 276 H.P. for curve 45. The internal gas temperature 26 is approximately 108°C. as shown by point 46 whereas the ambient temperature is approximately 50°C. at point 48. Points 49 and 54 show the temperature of the internal surface 23 of the bearing cap 22 for the noninsulated and noncooled curve 44 and the insulated and cooled curve 45, respectively. Points 51 and 55 illustrate the temperature of the bearing outer race 16 for the respective curves 44 and 45 measured by a resistance temperature detector (RTD) installed for monitoring the outer bearing race temperature. Points 52 and 56 illustrate the temperature of the outer surface 24 for the respective curves 44 and 45.

Without the benefit of the thermal insulation and the fan, the greatest temperature gradient between the internal gas temperature 46 and the ambient air temperature 48 is shown by curve 44 to be between the outer surface temperature 52 and the ambient air temperature 48. With the benefit of the insulation and fan of the present invention, the greatest temperature gradient between the internal gas temperature 46 and the ambient air temperature 48 is shown by curve 45 to be located between the internal gas temperature 46 and the inner surface temperature 54. The large gradient between points 52 and 48 indicates that the prior art inherently has an insulating air space in the ambient adjacent the outer surface 24. The invention has essentially taken this prior art insulating air space adjacent to the outer surface 24 and has moved the large temperature gradient to be between the gas 26 internal the machine and the inner surface 23. Consequently, there is a large temperature gradient across the insulating air space 29 shown by points 46 and 54 and a small gradient between the outer surface temperature 56 and the ambient air temperature 48. The important consequence of the relocation of the large temperature gradient is the reduction in bearing outer race temperature from approximately 100°C. to 70°C. Various tests have been performed incorporating this invention resulting in a range in reduction of bearing temperature from a minimum of 25°C. to a maximum of 40°C. depending upon the particular geometry. A reduction of 25° to 40°C. in bearing temperature will provide a substantial improvement in bearing life and reduce maintanence. The lower operating temperature of the bearing will also be less destructive to the grease lubricating the bearing.

Figure 3:
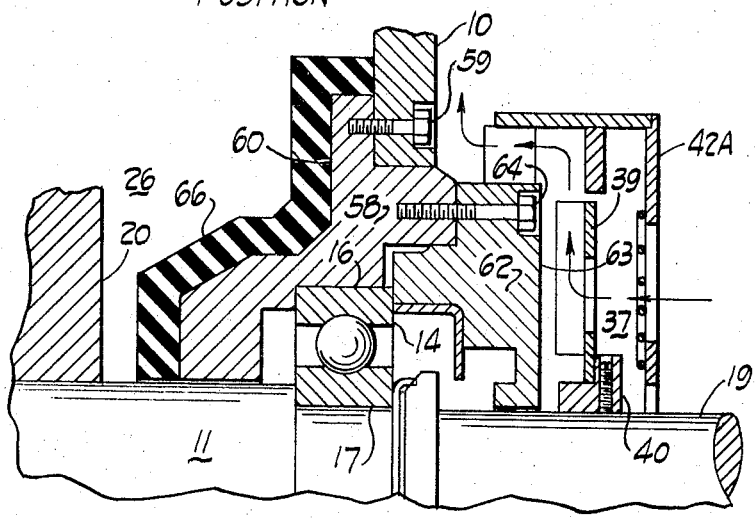
FIG. 3 is a longitudinal sectional view of a thermally insulated bearing which is a variation of that shown in FIG. 1; and, FIG. 4 is a graph showing temperature as a function of position along the axis of FIG. 3.

FIG. 3 is a longitudinal sectional view of a portion of an inductive rotating machine including a frame 10 and a bearing 14 having an outer race 16 and an inner race 17. The bearing 14 journals a rotor 11 shown as a shaft 19 and an armature 20. The bearing 14 is mounted to the frame 10 by a cartridge 58 having an inner surface 60 which is thermally coupled to the bearing 14 by the relatively high thermal conductivity of the cartridge 58. The cartridge 58 is secured to the frame 10 by a screw 59. The bearing is held in the cartridge 58 by a bearing outer cap 62 secured by screw 64 which outer cap has an outer surface 63 which is thermally coupled to the bearing 14 by the relatively high thermal conductivity of the bearing outer cap 62. The bearing 14 is thermally insulated from the internal gas 26 of the machine by insulating means 66 shown in contact with the inner surface 60. In this embodiment the thermal insulator is a solid material whereas the insulator in FIG. 1 utilized a dead air space. The thermal insulator 66 has been found effective using several materials including (1) epoxy varnish and glass tape (2) urethane foam (3) epoxy cement and asbestos millboard and (4) asbestos pipe insulation but it is understood that any suitable insulation can be used to practice the invention. At present, tests indicate the air space of FIG. 1 is the most efficient and desirable. The invention incorporates means 37 for exchanging heat with the bearing 14 shown as a fan 39 mounted on a mounting ring 40 forcing air across the outer surface 63 as shown by the arrows. The fan 39 is covered by a fan cover 42A.

Figure 4:
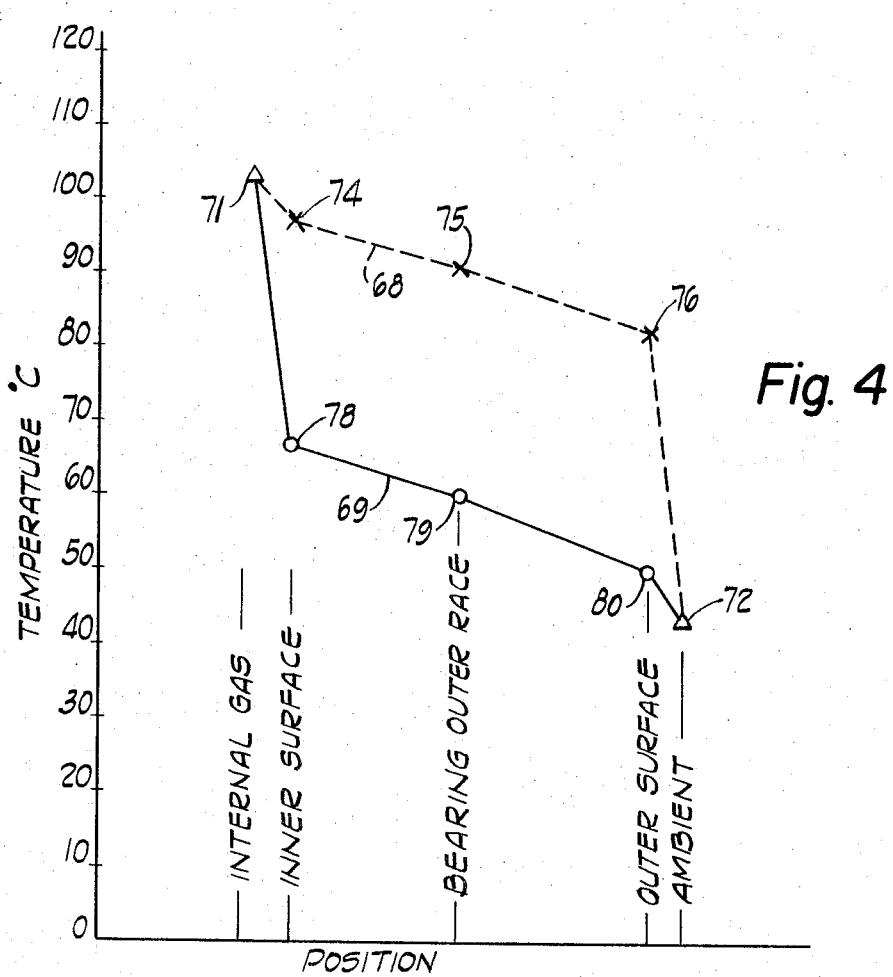

FIG. 4 is a graph of temperature as a function of position within the machine in FIG. 3. Curve 68 represents the temperature distribution without thermal insulation and without a fan whereas the curve 69 represents the temperature distribution using the thermal insulation 66 and fan 39. Curves 68 and 69 were compiled from test data on a 200 H.P. motor at 3,600 RPM using an asbestos millboard insulation having a thickness of approximately three-fourths of an inch. The internal gas temperature 71 and the ambient temperature 72 are common to curves 68 and 69 with points 74 and 78, respectively, representing the temperature at the inner surface 60 of the cartridge 58. Points 75 and 79 illustrate the temperature of the bearing outer race 16 with points 76 and 80 showing the outer surface temperature for the respective curves 68 and 69. The results are similar to FIG. 2 in that the maximum temperature gradient has been taken from between points 76 and 72 for the noninsulated machine and has been relocated across the thermal insulation 66 between points 71 and 78 for the machine having the insulation and fan. Consequently, the bearing outer race temperature is reduced by approximately 30°C.

The invention has been set forth as a dynamoelectric machine with a thermally insulated bearing comprising a frame 10, a rotor 11, and bearing means 14 with means for mounting the bearing means to the frame for journalling the rotor 11. The invention includes thermal insulation means for insulating the bearing 14 from the surroundings on a first side of the frame 10 shown as the internal gas 26. The invention comprises means for exchanging heat between the bearing means 14 and the ambient on a second side of the frame 10 to provide a proper operating temperature for the bearing 14. Although the means for exchanging heat has been shown as a fan 39, it is understood that any method of heat exchanging is equally applicable and may be accomplished through an intermediate thermally conductive material such as the frame or bearing cap.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dynamoelectric machine, comprising in combination:
    a frame;
    a rotor;
    bearing means;
    means mounting said bearing means to said frame for journalling said rotor;
    said bearing means being in thermal contact with a portion of an inner surface of the machine and in thermal contact with a portion of an outer surface of the machine;
    thermal insulation means established adjacent said portion of the inner surface of the machine to thermally insulate said bearing means from the gas internal the machine;
    and means for removing heat from said portion of the outer surface of the machine to provide a reduced operating temperature of said bearing means.

2. A dynamoelectric machine as claimed in claim 1 wherein said frame includes a region of reduced cross-sectional frame area in proximity to said bearing means to provide reduced heat transfer through said reduced cross-sectional frame area.

3. A dynamoelectric machine as claimed in claim 1 wherein said means for removing heat includes fan means.

4. A dynamoelectric machine as claimed in claim 1 wherein said mounting means establishes said frame and said bearing means to form a totally enclosed machine.

5. A dynamoelectric machine as claimed in claim 1 wherein
    said thermal insulation means includes shield means spaced from said portion of the inner surface creating an insulating gas space therebetween.

6. A dynamoelectric machine as claimed in claim 1 wherein
    said thermal insulation means includes a solid insulator mounted adjacent to said portion of the inner surface.

7. A dynamoelectric machine as claimed in claim 6 wherein said insulator is in contact with said inner surface.

8. A dynamoelectric machine as claimed in claim 1 wherein said frame includes a region of reduced cross-sectional frame area located at a boundary between said portion of said inner surface and the remainder of said inner surface to provide reduced heat transfer through said reduced cross-sectional frame area from said remainder of said inner surface to said bearing means.

9. A dynamoelectric machine comprising in combination:
    a frame;
    a rotor including a shaft;
    bearing means;
    means mounting said bearing means to said frame for journalling said rotor;
    winding means in said machine producing an elevated gas temperature inside the machine during operation;
    said bearing means and said shaft and said frame forming a totally enclosed machine;
    said bearing means being in thermal contact with a portion of an inner surface of the machine;
    said bearing means being in thermal contact with a portion of an outer surface of the machine;
    said frame having a region of reduced cross-sectional area in proximity to said bearing means to reduce the heat transfer from said frame to said bearing means through said reduced frame area;
    shield means;
    means mounting said shield means to be spaced from said portion of the inner surface for creating a space therebetween for thermally insulating said portion of the inner surface from said elevated gas temperature inside the machine;
    fan means;
    and means mounting said fan means on said shaft for forcing ambient gas across said portion of the outer surface to provide a reduced operating temperature of said bearing means.

* * * * *